Nov. 16, 1965 L. E. ELFES ETAL 3,218,019
ADJUSTABLE SEAT
Filed Aug. 2, 1962 4 Sheets-Sheet 2

INVENTORS
Lee E. Elfes, &
BY Harold O. Holz
Barnard & McGlynn
ATTORNEYS

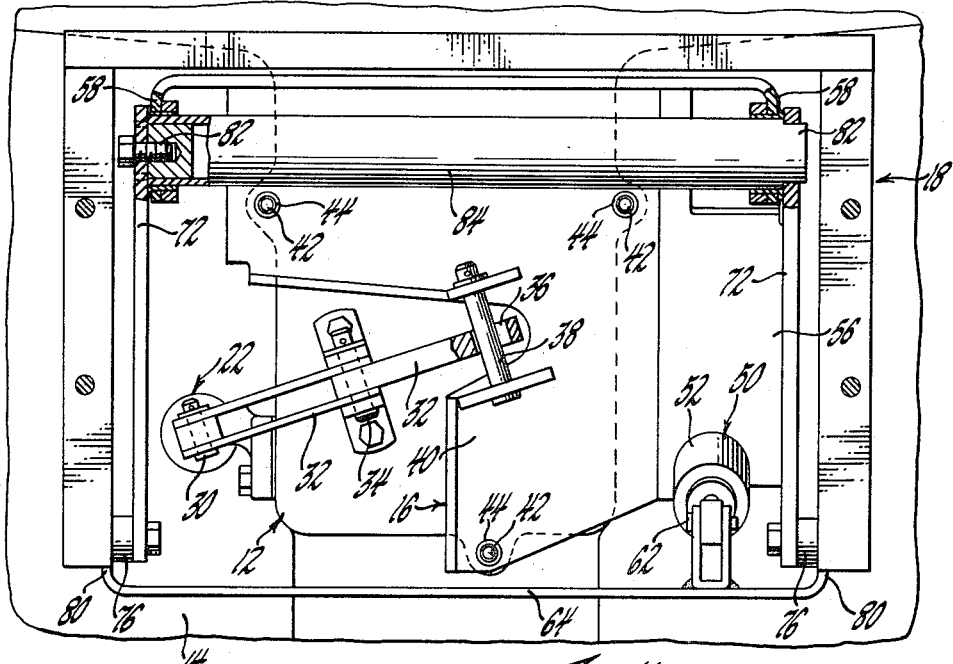

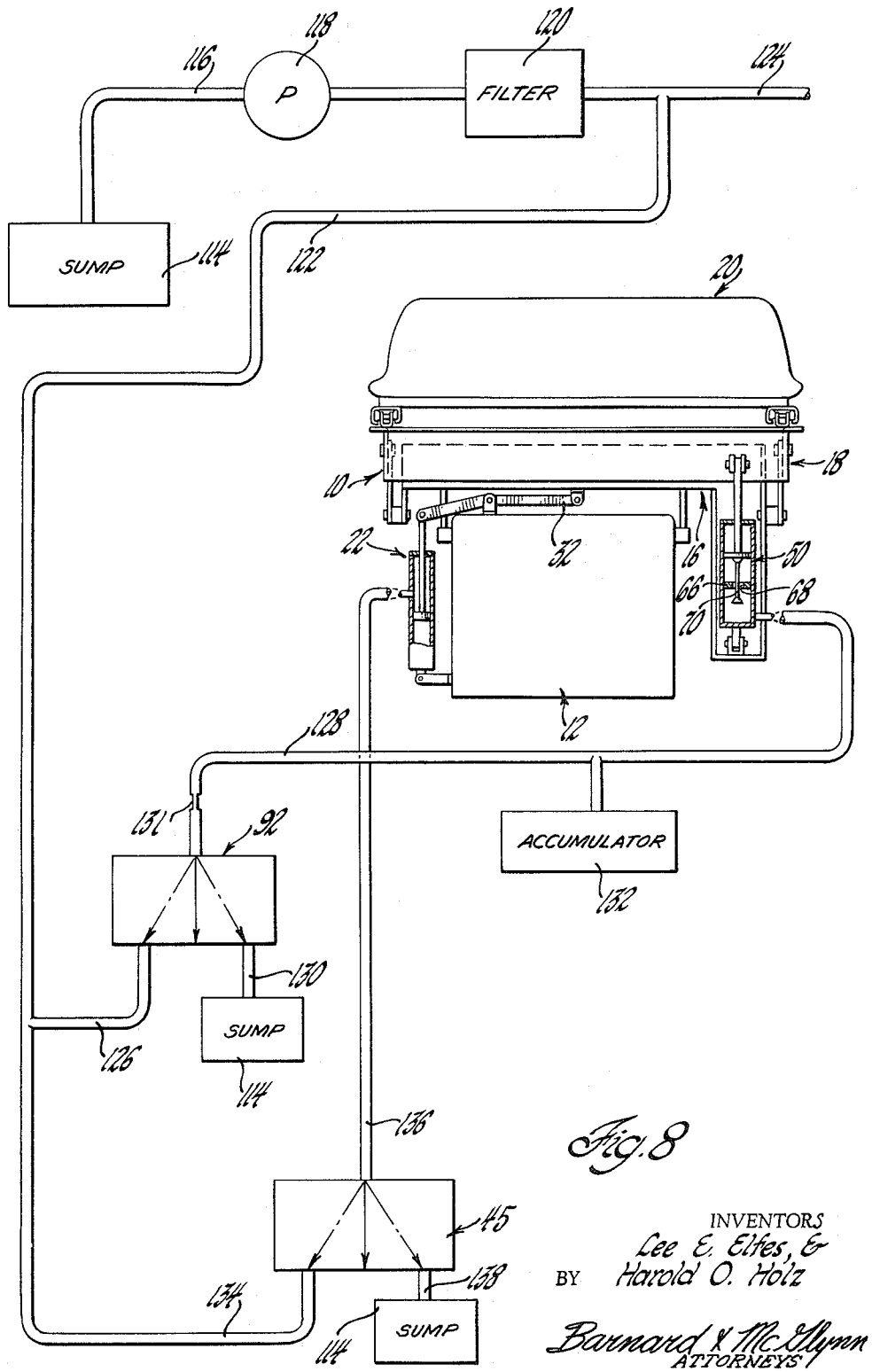

United States Patent Office 3,218,019
Patented Nov. 16, 1965

3,218,019
ADJUSTABLE SEAT
Lee E. Elfes, Birmingham, and Harold O. Holz, Linden, Mich., assignors to Massey-Ferguson Inc., Detroit, Mich., a corporation of Maryland
Filed Aug. 2, 1962, Ser. No. 214,354
26 Claims. (Cl. 248—399)

This invention relates to seat assemblies and, in particular, to a vehicle seat assembly comprising seating means and adjustable suspension means therefor adapted for selective adjustment of the seating means vertically and horizontally to a predetermined reference position and height in accordance with the desires of a particular vehicle operator, the suspension means including yieldable means functioning to support and suspend the seating means for a range of rising and falling cushioned movement to either side of the aforementioned predetermined reference position and height and being operable automatically in response to variations in load imposed on the seating means, and particularly static loads, to always tend to return the seating means to the aforementioned predetermined reference position and height as it moves to either side thereof.

Certain vehicles in use today, such as agricultural tractors and various types of earth-moving equipment such as self-propelled scrapers, are often operated at relatively great speeds over relatively rough terrain. As a consequence, considerable effort has been devoted to the design of seat assemblies including yieldable suspension means therefor to provide a cushioned body support and reasonably soft ride for the operator of such vehicles. Thus, vehicle seat assemblies have been devised comprising yieldable suspension means including spring means, such as axially wound mechanical torsion spring means or torsionally resilient donuts of rubber or the like, operating through suitable linkage members, usually of the parallelogram type, to yieldably suspend a seating means or seat pan for a predetermined range of rising and falling cushioned movement in response to various dynamic or shock loadings on the vehicle, the aforementioned reference height being determined by preselection of the loading of the spring means of the suspension in accordance with the static load or weight of the particular vehicle operator. More specifically, it has heretofore been recognized as being desirable for each individual operator occupying such a yieldably suspended seat of the type aforementioned to preadjust the yieldable spring means thereof in accordance with his own static load or weight in order to initially dispose the seating means or seat pan at a predetermined reference height intermediate the range of cushioned movement thereof for optimum results from the yieldable suspension means in response to dynamic or shock loads imposed thereon.

In some seat assemblies of this type, additional means have been provided for bodily adjusting the seating means and its yieldable suspension mechanism in unison to and holding them at a fixed position or height to provide, in conjunction with subsequent adjustment of the torsion spring means of the suspension as aforementioned, greater flexibility in selecting the aforementioned predetermined reference height and range of cushioned movement of the seating means with reference to the requirements of a particular vehicle operator and the various hand and foot-operated controls he is called upon to tend. Such additional adjusting means has ordinarily consisted of mechanism structurally and functionally independent of the yieldable suspension.

Irrespective of the presence or absence of such additional adjusting means in seat assemblies of the type aforementioned, it may be observed that, in the final analysis, initial adjustment of the seating means or seat pan to a predetermined reference position and height by one vehicle operator in accordance with his weight does not dispose the seating means or seat pan at such height for another vehicle operator weighing more or less than the operator making the initial adjustment. For example, adjustment of and loading of the yieldable spring element of the yieldable suspension of the seat assembly by one vehicle operator to dispose the seat pan in the desired predetermined intermediate reference height in accordance with his weight and relative to the range of cushioned movement thereof under the influence of dynamic or shock loadings imposed thereon will be insufficient to support a subsequent heavier operator at such height. Thus, when the heavier operator occupies the seat pan, the latter will sink below such predetermined reference height to an extent determined by the difference in weights between operators and, if the difference is great enough, might even engage the usual stop provided to limit falling movement of the seat pan under dynamic or shock loading conditions. As a result, each subsequent operator of a vehicle equipped with such a seat assembly must first reload or readjust the spring element of the suspension means to initially dispose the seating means or seat pan at the aforementioned predetermined reference height thereof to obtain optimum results from the suspension as the seating means rises and falls within the range of movement thereof in response to shock or dynamic loads. As a matter of fact, in recognition of the need for repeated adjustments of suspensions of this type, such suspensions are usually provided with some means to indicate when it has reached the predetermined reference height and, hence, that the yieldable spring element of the suspension has been loaded or unloaded sufficiently in accordance with the weight or static load of the vehicle operator.

The present invention is directed to an improved seat assembly of the general type aforementioned and comprising base support means adapted to be secured in a relatively fixed position with respect to a movable seat support means, and yieldable suspension means interconnecting the relatively fixed base support means and the movable seat support means to yieldable suspend the latter for a range of rising and falling movement relative to a predetermined intermediate reference position and height thereof above the base support means in response to dynamic loads imposed thereon, the suspension means being particularly characterized by the fact that it is operable automatically in response to variations in the static load imposed on the set support means, as by variations in the weights of particular vehicle operators occupying the same, to dispose the seat support means at the predetermined reference position and height thereof.

The yieldable suspension means of this invention is further particularly characterized by the fact that it comprises motor means operatively interconnecting the aforementioned seat support means and base support means, and control means connected to the motor means and automatically responsive to variations in height of the seat support means from the aforementioned predetermined reference height, particularly in response to changes in the static load imposed thereon, to actuate the motor means to return the seat support means to the aforementioned predetermined reference height thereof.

More specifically, the aforementioned motor means preferably takes the form of a fluid pressure operated jack of the type including relatively reciprocable piston and cylinder members operatively connected between the seat support means and the base support means, there being additionally provided a source of substantially incompressible fluid under pressure communicable with the jack through control valve means having a first position preventing flow of fluid therethrough at the predetermined reference height of the seat support means, and being automatically responsive to variations in height of the latter from the predetermined reference height thereof for movement to second and third positions, respectively, communicating the source to the jack and the latter to exhaust, thereby resulting in the seat support means continuously seeking a level corresponding to the predetermined reference height, yieldable means such as an accumulator also being provided to cushion rising and falling movement of the seat support means in response to dynamic loads imposed thereon.

According to another aspect thereof, the invention is further characterized by the fact that the fluid system associated with the yieldable suspension means and including the source of substantially incompressible fluid, control valve means and jack aforementioned form a relatively incompressible fluid link between the yieldably suspended seat support means and cushioning accumulator means or the like, whereby the function of the latter is to provide all cushioning action during the range of movement of the seat support means in response to dynamic loads while substantially incompressible fluid under pressure is selectively supplied to and exhausted from the aforementioned fluid system to pump up or exhaust fluid therefrom in accordance with the direction in which the seat support means varies from the predetermined reference height thereof. In this regard, the invention is particularly characterized by the fact that the aforementioned control valve means includes a restriction in the connection between the latter and the jack to delay fluid flow therebetween to a predetermined extent, thereby tending to make the fluid system substantially non-responsive as a practical matter to abrupt cyclic changes in the vertical height of the seat support means as is occasioned by repeated shock or dynamic loads thereon and, therefore, primarily responsive to changes in height of a more longer duration as are occasioned by changes in static load thereon caused by the weights of different vehicle operators.

Further in this regard, the fluid system is further characterized by utilizing a jack of the type aforementioned including means therein to dampen relative movement of the piston and cylinder members thereof to a substantially constant extent between extreme relative positions thereof, and variably dampening such movement thereof at such extreme positions.

According to another aspect thereof, the seat assembly of this invention is further characterized by the fact that the aforementioned base support means includes a fixed support member adapted to be mounted in a suitable position on a vehicle, a movable or intermediate support member interposed between the fixed support member and the aforementioned seat support means and connected to the latter by the yieldable suspension means, and selectively adjustable means interconnecting the fixed and movable support members to adjust the latter to and hold it at a predetermined height relative to the fixed support member, thereby enabling initial adjustment of the movable support member to relatively fixed position in accordance with the desires of a particular vehicle operator to best accommodate hand and foot manipulations of various controls of the vehicle. More specifically in in this regard, the aforementioned selectively adjustable means preferably comprises another fluid pressure operated jack connected through a suitable manually operated control valve means to the aforementioned source of fluid under pressure whereby fluid from the source may be supplied to the latter jack or fluid exhausted therefrom to adjust the height of the movable support member.

The invention is further characterized by the fact that both of the aforementioned jacks; that is, the one utilized to initially position the movable support member of the base support means at a preselected height and the other forming a part of the yieldable suspension, are each mounted on opposite sides of a vertical plane through the fore and aft centerline of the seat assembly and respectively connected to associated components of the seat assembly in such a manner as to effectively transmit thrust therefrom to such components without imposing undue stresses on the latter, while the mountings of the jacks in the positions aforementioned permit ready access thereto.

For a further description of the invention in conjunction with a preferred embodiment thereof, reference will now be made to the drawings in which:

FIGURE 4 is a sectional view taken on line 4—4 of FIGURE 2;

FIGURE 5 is an enlarged sectional view taken on line 5—5 of FIGURE 1;

FIGURE 6 is a sectional view taken on line 6—6 of FIGURE 5;

FIGURE 7 is a view schematically illustrating a control console and manually operable valve member associated therewith; and FIGURE 8 is a schematic illustration of the fluid system associated with the seat assembly.

Figure 1:
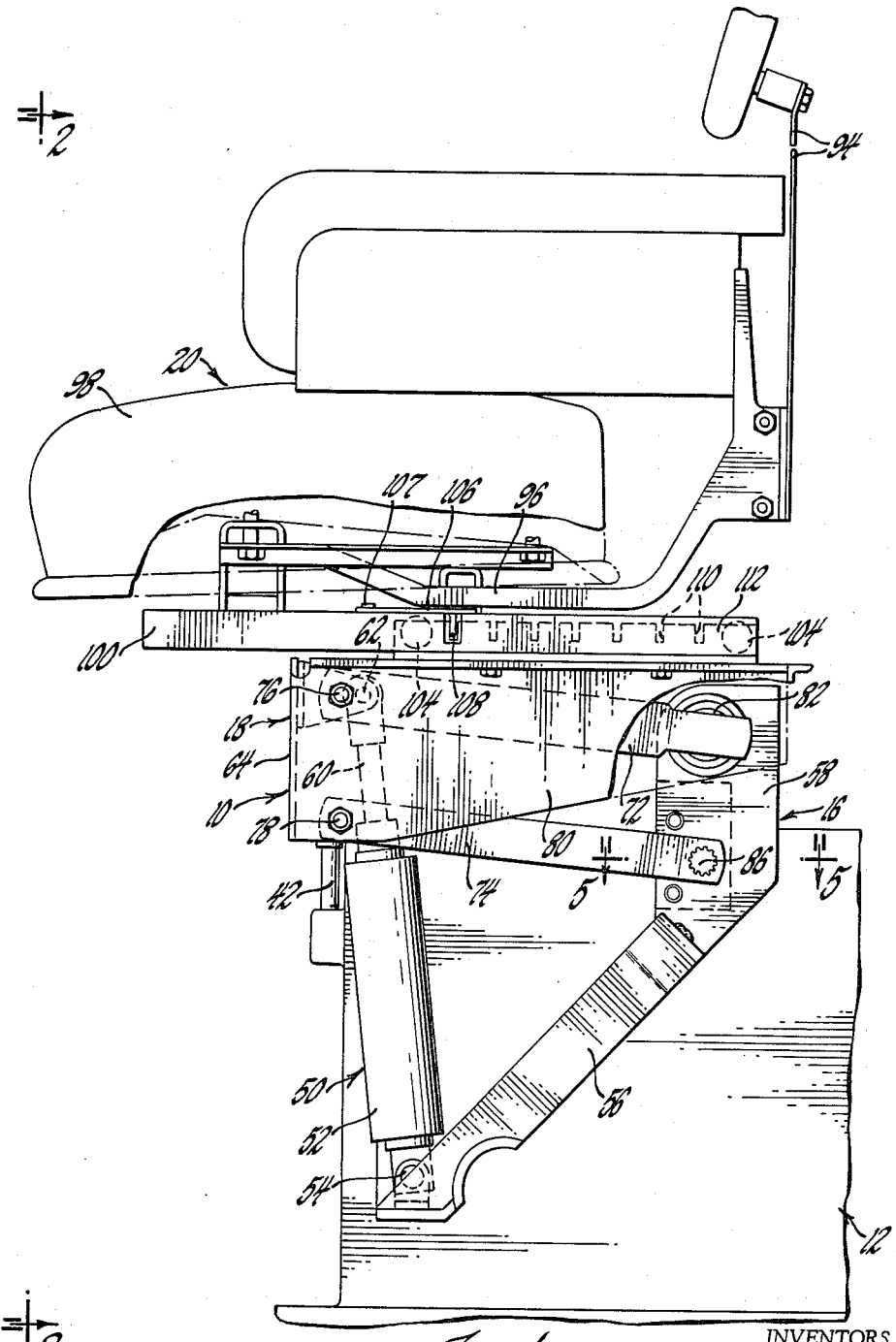
FIGURE 1 is a side elevation of a seat assembly, partly broken away to show certain details thereof, illustrating a preferred embodiment of the invention.
Figure 2:
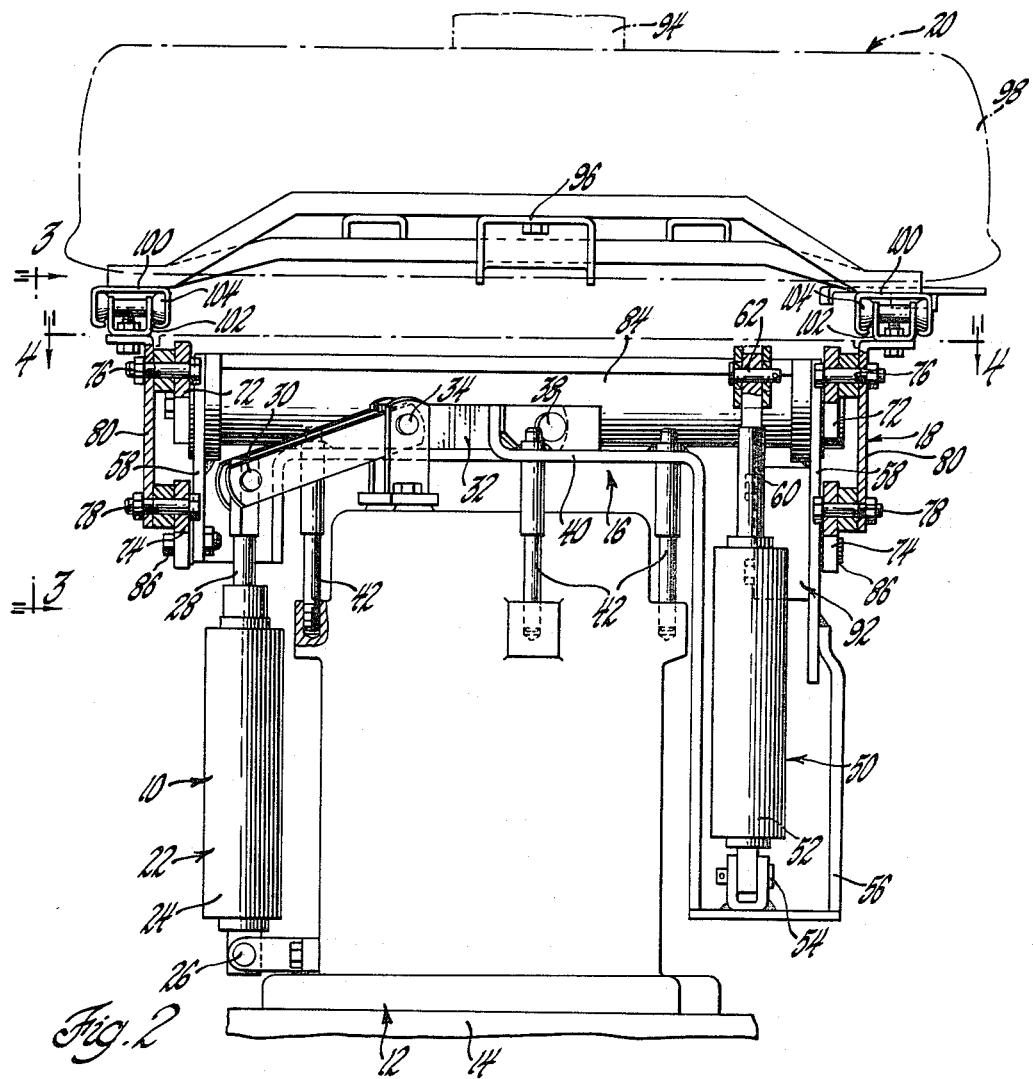
FIGURE 2 is a fragmentary view, partially in section and broken away to illustrate certain details, taken on line 2—2 of FIGURE 1.
Figure 3:
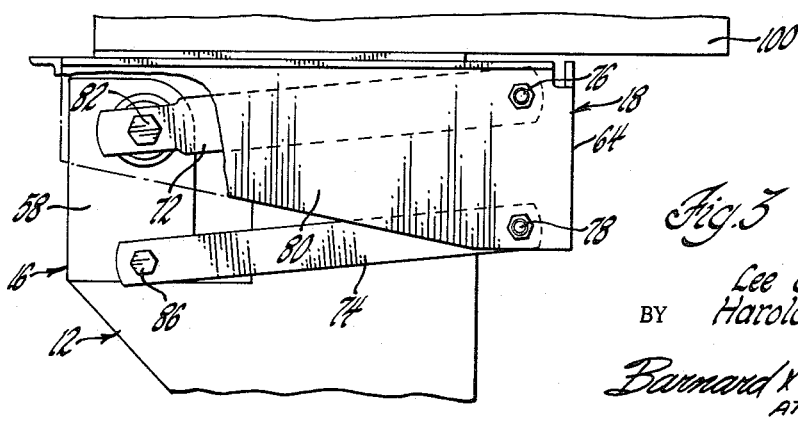
FIGURE 3 is a fragmentary view taken on line 3—3 of FIGURE 2.

Referring now particularly to FIGURES 1 to 4 of the drawings, the numeral 10 generally indicates a seat assembly comprising a lower or base frame member 12 adapted to be suitably rigidly secured on a suitable portion 14 of a vehicle, an intermediate movable frame member 16 mounted in a manner to be hereinafter described for selective vertical adjustment relative to and above the lower or base frame member, an upper or seat supporting frame member 18 yieldably suspended in a manner to be hereinafter described on the intermediate frame member 16 irrespective of the adjusted position selected for the latter, and the seat means 20 horizontally adjustably mounted in a manner to be hereinafter described on the upper or seat supporting frame member 18.

More specifically, the intermediate movable frame member 16 is adjustably supported above the lower or base frame member 12 by means of a fluid pressure operated motor means or jack 22 having its cylinder member 24 suitably pivotally connected at 26 to the lower end of the base frame member 12 to one side thereof and, with reference additionally to FIGURE 8, including the usual reciprocable piston head secured to the piston rod 28 pivotally connected at 30 to one end of a lever 32 pivotally connected at 34 intermediate its ends to the upper end of the base frame member. The other end of the lever is provided with an elongate slot 36 pivotally and slidably mounted about a pin 38 mounted on the floor portion 40 of the intermediate frame member 16. A plurality of upright guide pins 42, herein shown to be three in number, are suitably secured to base frame member 12 near the upper end thereof, are respectively slidably received in a corresponding number of guide bushings 44 secured to and depending from floor portion 40 of the intermediate frame member to guide the latter for vertical movement upon actuation of the jack 22.

As will appear hereinafter, a suitable fluid system including manually actuable control valve means 45 including an actuating handle 46, suitably mounted adjacent the seat assembly as on a control console 48 as indicated in FIGURE 7 is provided to control supply of fluid under pressure to and exhaust of fluid from the jack 22 to, respectively, shorten and lengthen the latter to raise and lower the intermediate frame member 16 relative to the base frame member 12, the intermediate frame member being held in any so selected position or height by the operating fluid held in the jack which may be of the single-acting type as shown operating through gravity to dispel or exhaust fluid therefrom in accordance with manipulation of the aforementioned control valve means 45.

A fluid pressure operated motor means or jack 50 comprises a cylinder member 52 pivotally connected at 54 to the lower end of a support arm 56 extending downwardly and forwardly from one of two laterally spaced side walls 58 of the intermediate frame member 16 for movement with the latter and, with reference additionally to FIGURE 8, a piston head is reciprocably disposed within the cylinder member and secured to a piston rod 60 one end of which is pivotally connected at 62 to the laterally extending front wall 64 of the upper or seat supporting frame member 18 relatively nearer one front corner than the other thereof. With reference to the illustration in FIGURE 8, it will be seen that the jack 50 includes a partition 66 having an opening 68 therein through which the other end of the piston rod 60 extends with a predetermined radial clearance, spaced portions of this end of the rod being provided with axially tapered cone-shaped members 70 cooperable with opening 68 to variably throttle flow of fluid therethrough between opposite sides of partition 66 at opposite extreme positions of movement of the piston within the cylinder. This construction is provided for substantially uniform dampening of piston movement between such extreme positions thereof as aforementioned, and progressively increasing dampening of movement at such extreme positions as will appear more fully hereinafter from a consideration of the fluid system associated with the jack 50.

A pair of upper and lower parallelogram-type guide links 72 and 74, respectively, each have a forward end thereof pivotally connected at vertically spaced points indicated at 76 and 78 to each of the laterally spaced side walls 80 of the upper or seat supporting frame member 18 and projecting rearwardly from the front wall 64 thereof, while the other ends of the respective upper guide links 72 are suitably rigidly secured as indicated at 82 to opposite ends of a hollow tubular torsion bar 84 extending transversely of and suitably rotatably supported on the side walls 58 of the intermediate frame member 16. The other ends of the lower guide links 74 are also pivotally connected as indicated at 86 to the side walls 58 of the intermediate frame member in a manner so that the respective pairs of guide links form a parallelogram-type linkage to substantially maintain the seat supporting frame member 18 in a substantially horizontal attitude as it rises and falls within a range of cushioned movement thereof as will appear hereinafter. In this regard, however, the pivotal connection 86 of the rearward end of one of the lower guide links 74 is through a valve operating member 88 rotatably supported in valve body 90 suitably secured to the adjacent side wall 58 of intermediate frame member 16 and forming an automatically operable control valve means indicated generally at 92 in FIGURES 2, 5 and 6 to control selective supply of fluid to and exhaust of fluid from the jack 50 in a manner to be hereinafter described.

The seat means 20 comprises a back rest member 94 suitably connected to a seat base 96 on which cushion 98 rests, the seat base being provided with laterally spaced downwardly opening tracks 100 cooperating with roller means 104 disposed therebetween for horizontal rolling adjustment of the seat means 20 relative to and along the seat supporting frame member 18. In order to retain the seat means in any position of adjustment along the seat supporting frame member, there is provided a conventional manually operable latch mechanism of the type including a manually operable latch lever 106 pivotally connected as at 107 to the seat base and including a dogging member 108 selectively engageable and disengageable with respective ones of locking notches 110 arranged along a locking rack 112 secured to the seat supporting frame member 18. The usual spring, not shown, extends between the latch lever 106 and the seat base 96 to continuously urge the lever towards latching engagement with one of the notches 110, the lever being movable manually to disengage the dogging member from a particular locking notch during adjustment of the seat means.

Reference will now be made to FIGURE 8 and the fluid system associated with the seat assembly 10, like numerals being employed therein to indicate various components previously described. Thus, a sump 114 is provided containing a suitable hydraulic oil or other substantially incompressible fluid for supply through a conduit 116 to the inlet of a suitable pump 118, preferably driven through a suitable accessory drive from the vehicle engine. Fluid so supplied is delivered under pressure through a filter 120, if required, to a manifold conduit 122 serving the seat assembly and to other fluid operated devices on the vehicle, if any, through conduit 124. Fluid under pressure is adapted to be automatically selectively supplied as will be pointed out hereinafter from the manifold conduit 122 through the conduit 126, automatic control valve means 92 and conduit 128 which includes restriction 131 to one end of the cylinder of the jack 50, and exhausted from the conduit 128 through the control valve means 92 and conduit 130 to sump. A suitable accumulator 132 is connected to conduit 128 between the control valve means 92 and jack 50 for response to changes in the pressure of the fluid in jack 50, it being understood that the accumulator may be of any conventional type characterized, for example, by a movable rigid piston or flexible diaphragm member cooperating with a housing to form a chamber to receive fluid under pressure from conduit 128 in opposition to chamber on the other side of the piston or diaphragm preferably filled with a suitable compressible fluid medium, such as air, or even a resilient mechanical spring element.

In similar fashion, fluid under pressure is adapted to be selectively supplied from the manifold conduit 122 through the conduit 134 and manually operable control valve 45 to the conduit 136 and one end of the cylinder of jack 22, and exhausted from the conduit 136 through the control valve 45 to the conduit 138 and to sump 114.

The details of the automatically operable control valve 92 are shown clearly in FIGURES 5 and 6. Thus, the valve body 90 is suitably rigidly secured to one side wall 58 of the intermediate support frame as aforementioned and includes an inlet port 140 connected to the conduit 126, an outlet port 142 connected to the conduit 128 and an exhaust port 144 connected to the conduit 138 and sump. It will be noted that the outlet port 142 includes a restrictive or throttling orifice 146 therethrough, corresponding to restriction 131 in FIGURE 8, through which all oil must pass to and from the conduit 128 and the jack 50. One-way spring loaded ball check valves 148 and 150 are associated with the respective inlet and exhaust ports 140 and 144 to prevent any operating flow of fluid through the valve body with the check valves seated and valve operating member 88 in a first or neutral position as shown in FIGURES 5 and 6. This is the position the automatic control valve means assumes when the upper or seat supporting frame member 18 and seat means 20 mounted thereon are at a predetermined reference height intermediate extreme upper and lower positions of the range of cushioned travel thereof as will appear more fully hereinafter.

The valve operating member 88 is suitably rotatably supported within the valve body 90 and includes an intermediate portion 152 substantially triangularly-shaped in cross section, one end of the valve operating member being rigidly secured to the rearward end of one of the lower control links 74 to pivotally support the latter as previously described. With the valve operating member in its first or neutral position as aforementioned and as indicated schematically in full line in FIGURE 8, operating fluid is locked in conduit 128 between the outlet port 142 and the jack 50 to maintain seat means 20 and seat supporting frame member 18 at the predetermined reference height aforementioned. On the other hand, since valve body 90 is fixed to intermediate frame member 16 and valve operating member 88 is fixed to one lower link 74 which rotates in response to rising or falling movement of seat supporting frame member 18, the valve operating member 88 will be rotated counterclockwise in FIGURE 6 in response to falling or downward movement of the seat supporting frame member to engage portion 152 with and displace ball check valve 148 from inlet port 140 to communicate the latter and pump 188 with outlet port 142 and jack 50 as indicated in one dotted line position of FIGURE 8. Conversely, upward movement of the seat supporting frame member 18 from the predetermined reference height will cause the valve operating member 88 to rotate clockwise in FIGURE 6 to open the other ball check valve 150 and communicate outlet port 142 and the jack 50 to exhaust port 144 and sump as indicated in the other dotted line position of FIGURE 8.

The manually operable control valve means 45 is preferably identical to that previously described except that the restriction 146 in the outlet port 142 will be eliminated for free rapid transfer of fluid to and from the jack 22. Furthermore, the rotatable valve operating member 88 of the manually operable control valve is suitably connected to the operating handle 46 indicated in FIGURE 7 to selectively position the valve operating member in a neutral or first position blocking any flow of fluid therethrough, and second and third positions respectively communicating the jack 22 with the manifold conduit 122 and the jack with sump 114 to operate the jack in opposite directions as desired to adjust the height of the intermediate frame member 16. In all other particulars, the manually operated control valve 45 may be identical to that previously described.

In operation, it may be assumed that the seat assembly 10 has just been installed on the vehicle and the entire assembly is collapsed; that is, the pump 118 has not been actuated and the respective jacks 22 and 50 have been telescoped to the maximum extent possible due to gravity. At this time, the pump 118 is placed in operation to fill the manifold conduit 122 and, thereafter, the control valve means 92 will function completely automatically to dispose the seat support frame member 18 at a predetermined reference height above the intermediate support frame member 16 irrespective of the particular position in which the latter is placed; that is, whether or not the manually operated control valve means 45 is actuated. For example, it may be further assumed that the pump is operating with the seat means 20 unoccupied and without operating the manual control valve means 45. Since the assembly is completely collapsed and, in particular, the seat support frame member 18 is collapsed upon the intermediate frame member 16 and assumes a position beneath its predetermined reference height, the automatic valve operating member 88 will be in an extreme position counterclockwise from that shown in FIGURE 6. As a result, under these initial operating circumstances, the ball check valve 148 is off its seat and fluid under pressure is automatically supplied from conduit 126 to conduit 128, but gradually so due to orifice 146 in outlet port 142. Fluid so supplied flows into the jack 50 causing the latter to gradually extend to pivot the lower guide links 74 clockwise in FIGURE 1 to ultimately dispose the valve operating member 88 in the position of FIGURE 6. At this time, further flow through the control valve means 92 to or from the conduit 128 is prevented.

It may now be assumed that a vehicle operator of some particular weight occupies the seat means 20. If the operator drops into the seat means rather abruptly to add dynamic loading to the latter in addition to his own static load or weight, the seat supporting frame 18 may spring downwardly to an extent in excess of downward movement thereof which would occur merely as a result of his weight alone if he entered the seat rather gently. If the loading of this nature is sufficient, the accumulator 132 will respond in opposition to the increase in pressure in the conduit 128 as a result of the piston of jack 50 moving downwardly in its cylinder to cushion such loading, the accumulator thereafter recovering and acting immediately to return the piston of the jack upwardly. During this abrupt loading and relatively immediate return of the jack 50, the valve operating member 88 will necessarily first move accordingly to connect inlet and outlet ports 140 and 142 and then oppositely in a direction toward the position of FIGURE 6. However, since the seat support frame member 18 was initially disposed at a reference height without being occupied, the static load of the vehicle operator now occupying it will dispose the seat support frame member in a position beneath its predetermined reference height and the valve operating member 88 will hold the ball check valve 148 open. Fluid is thus supplied automatically under pressure from the manifold conduit 122 to the inlet port 140, outlet port 142 and conduit 128 to extend jack 50 until such time as the seat support frame member 18 has again assumed the predetermined reference height aforementioned, at which time the control valve means 92 will be disposed in the neutral or first position of FIGURE 6 locking fluid in the conduit 128 between the control valve means and the jack 50.

At this time, or prior thereto if desired since it functions completely independent from the control valve means 92, the manual control valve means 45 may be manipulated by the vehicle operator to adjust the intermediate frame member 16 to any desired height, and the latch lever 106 may be operated to position the seat means 20 horizontally on the seat support frame member 18.

With the seat so occupied and adjusted under static conditions, the vehicle may be driven across rough and irregular terrain resulting in dynamic loadings on the seat support frame member 18. Thus, for example, when a vehicle wheel drops into a hole or the like resulitng in seat support frame member 18 rapidly falling toward the intermediate frame member 16, two things occur simultaneously. First, the accumulator 132 acts in opposition to the increase in pressure in the conduit 128 due to downward movement of the piston of jack 50 to cushion such falling movement, followed immediately by recovery of the accumulator and return thereof to thrust the seat support frame member 18 upwardly. Such abrupt cycling movement of the seat support frame member may occur repeatedly as the vehicle is driven over the terrain. Secondly, as such cycling of dynamic or shock loads occurs, the valve operating member 88 of automatic control valve 92 may rotate back and forth in opposite directions from the neutral position shown in FIGURE 6. As a consequence, a fluid connection may be repeatedly made between the outlet port 142 and the inlet and exhaust ports 140 and 144. It is at this point that the restriction 146 in FIGURE 6 and as indicated at 131 in FIGURE 8 becomes of particular significance since it delays to a predetermined desired extent appreciably supply of fluid to or exhaust of fluid from the conduit 128 and jack 50 in response to such cycling to enable the accumulator 132 to cushion and yieldably suspend the seat support frame member 18 without appreciably affecting the predetermined reference height of the seat support frame member. Thus, the accumulator 132 provides a yieldable support for the seat support frame member 18 in response to dynamic loads imposed thereon, while the automatic control valve means 92 and particularly the restriction in the outlet port thereof prevents appreciable adjustment of the jack 50 from a position corresponding to the predetermined reference height thereof in response to such dynamic loadings and yet responds to variations in static load such as different weights of vehicle operators to dispose the seat means 20 at the predetermined reference height.

Cushioned movement of the seat means 20 under the control of the accumulator 132 as aforedescribed is dampened substantially uniformly between and variably at extreme upper and lower positions of the piston of jack 50 within its cylinder by the piston rod thereof and the throttling members 70 axially spaced therealong as aforedescribed. Thus, for example, as the seat support frame member 18 falls toward its lower extreme position, operating fluid is throttled from above partition 66 to the other side thereof through opening 68 and the piston rod. As the frame member begins to reach its lower extreme position, upper throttling member 70 begins to enter and progressively throttles the passage of fluid through the opening 68 from the upper side of the partition 66 to the lower side thereof to progressively increase dampening action. In rebound or upward movement of the seat support frame member 18 under the influence of the accumulator 132, the lower throttling member 70 is in position to cooperate with the opening 68 in a similar manner.

It should now be apparent that, should the vehicle operator leave the seat means 20 at any time, the pressure of the fluid confined in the conduit 128 will cause the jack 50 to extend resulting in rising movement of the seat support frame member 18 relative to the intermediate frame member 16. Under such conditions, the automatic control valve means 92 is automatically positioned to exhaust fluid from the conduit 128 until such time as the seat support frame member 18 falls to its predetermined reference height. In similar fashion, if one vehicle operator leaves the seat means and another having a different weight than the first immediately occupies it, the automatic control valve means 92 immediately senses the change in static load on the seat means and either supplies fluid under pressure to or exhausts fluid from the jack 50 to move the seat support frame member 18 to the predetermined reference height. Thus, under all conditions of static load and whether occupied, unoccupied or interchangeably occupied by operators having different weights, the automatic control valve means functions to cause the seat support frame member 18 to automatically seek a predetermined reference height which may be determined at the factory, thereby positively insuring a designed predetermined reference height requiring absolutely no attention, control or readjustment by different vehicle operators.

It will also be noted that the respective jacks 22 and 50 are located on opposite sides of a vertical plane through the fore and aft center line of the seat assembly and, in particular, in readily accessible positions for installation, service and the like and providing a compact assembly of minimum overall height. In this regard it will be noted that the thrust of jack 50 is imposed between intermediate and seat support frame members 16 and 18 to one side of the aforementioned plane and closer to one front corner of the seat support frame member 18 than the other. It is the function of the upper guide links 72 and torsion bar 84 to prevent the thrust of jack 50, located as it is, from twisting or otherwise imposing deterious stresses on the seat support frame member 18. Thus, thrust of jack 50 is transmitted through the more closely adjacent upper guide link 72 and the torsion bar to the other upper guide link 72 to prevent such stresses.

In view of the foregoing exposition, it will now also be readily apparent that the latch mechanism previously described and adapted for horizontal adjustment of the seat means 20 on the seat support frame member 18 may be readily replaced by a fluid pressure operated jack similar to the jack 22 but of the double-acting variety, connected through a suitable manual control valve mounted on console 48 and connected to the manifold conduit 122 to adjust the seat means 20 horizontally and retain it in a horizontally adjusted position.

The embodiments of the invention in which an exclusive property or privilege is claimed are defined as follows:

1. A seat assembly comprising base support means, seat support means, and suspension means interconnecting said base support means and said seat support means to suspend the latter for a range of cushioned movement to either side of a predetermined reference height thereof above said base support means, said suspension means being operable automatically in response to variations in static load imposed on said seat support means to dispose the latter at said predetermined reference height thereof without substantially changing the cushioning characteristics of said suspension means.

2. The seat assembly according to claim 1 in which said base support means comprises fixed support means, movable support means, said suspension means interconnecting said seat support means and said movable support means, and further comprising selectively adjustable means interconnecting said fixed and movable support means to adjust the latter to and hold it at a predetermined height relative to said fixed support means.

3. The seat assembly according to claim 2 further comprising seat means, and means supporting said seat means on said seat support means for horizontal adjustment relative thereto.

4. A seat assembly comprising base support means, seat support means, and yieldable suspension means interconnecting said base support means and said seat support means to yieldably suspend the latter for a range of cushioned rising and falling movement relative to a predetermined reference height thereof above said base support means and intermediate the extreme positions of said seat support means in said range of movement thereof, said suspension means being operable automatically in response to variations in static load imposed on said seat support means to dispose the latter at said predetermined reference height thereof without substantially changing the cushioning characteristics of said suspension means.

5. A seat assembly comprising base support means, seat support means, yieldable suspension means including motor means operatively interconnecting said base support means and said seat support means to yieldably suspend the latter for a range of cushioned rising and falling movement relative to an intermediate predetermined reference height thereof above said base support means in response to loads imposed thereon, and control means operable automatically in response to variations in the load imposed on said seat support means to actuate said motor means to dispose said seat support means at said predetermined reference height thereof without substantially changing the cushioning characteristics of said suspension means.

6. A seat assembly according to claim 5 in which said control means includes time delay means to delay actuation of said motor means for a predetermined time interval in response to loads imposed on said seat means.

7. A seat assembly comprising base support means, seat support means, yieldable suspension means including fluid pressure operated motor means operatively interconnecting said base support means and said seat support means to yieldably suspend the latter for a range of cushioned rising and falling movement relative to an intermediate predetermined reference height thereof above said base support means in response to loads imposed thereon, a source of substantially incompressible fluid under pressure, conduit means communicating said source to said motor means, and control valve means in said conduit means operable automatically in response to variations in the load imposed on said seat support means and corresponding changes in height of the latter to actuate said motor means to dispose said seat support means at said predetermined reference height thereof without substantially changing the cushioning characteristics of said suspension means.

8. The seat assembly according to claim 4 in which said yieldable suspension means comprises fluid pressure operated motor means, a source of substantially incompressible fluid under pressure, means communicating said source to said motor means and including control valve means having a first position preventing flow of fluid therethrough at said predetermined reference height of said seat support means and being automatically responsive to variations in the height of the latter from said predetermined reference height toward either of said extreme positions thereof for movement to second and third positions, respectively, communicating said source to said motor means and communicating the latter to exhaust, and accumulator means including compressible fluid means responsive to changes in the pressure of said fluid in said motor means in response to variations in the load imposed on said seat support means to cushion movement of the latter relative to said base support means.

9. The seat assembly according to claim 4 in which said yieldable suspension means comprises fluid pressure operated motor means including relative reciprocable piston and cylinder members, a source of substantially incompressible fluid under pressure, means communicating said source to said motor means and including control valve means having a first position preventing flow of fluid therethrough at said predetermined reference height of said seat support means and being automatically responsive to variations in the height of the latter in either direction from said predetermined reference height for movement to second and third positions, respectively, communicating said source to said motor means and communicating the latter to exhaust, and accumulator means including compressible fluid means responsive to changes in the pressure of said fluid in said motor means as the members thereof reciprocate relative to each other in response to variations in the load imposed on said seat support means to cushion movement of the latter relative to said base support means.

10. The seat assembly according to claim 4 in which said yieldable suspension means comprises fluid pressure operated motor means, a source of substantially incompressible fluid under pressure, means communicating said source to said motor means and including control valve means having a first position preventing flow of fluid therethrough at said predetermined reference height of said seat support means and being automatically responsive to variations in the height of the latter in either direction from said predetermined reference height for movement to second and third positions, respectively, communicating said source to said motor means and communicating the latter to exhaust, and yieldable means responsive to changes in the pressure of said fluid in said motor means in response to variations in the load imposed on said seat support means to cushion movement of the latter relative to said base support means.

11. The seat assembly according to claim 10 in which said control valve means comprises a body member and a valve operating member cooperable therewith, and further comprising means respectively operatively connecting one of said members to said base support means and the other of said members to said seat support means for relative movement therebetween among said positions in response to changes in height of said seat support means relative to said base support means.

12. The seat assembly according to claim 11 in which said means respectively operatively connecting said members to said base and seat support means for relative movement therebetween comprises means fixing said one of said members to said base support means, and guide link means having one end thereof pivotally connected to said seat support means and the other end thereof secured to said other of said members to move the latter relative to said one of said members in response to changes in height of said seat support means relative to said base support means.

13. The seat assembly according to claim 10 in which said control valve means comprises a body member having an inlet port communicating with said source, an outlet port communicating with said motor means and an exhaust port, and a valve operating member movable relative to said body member from said first position preventing flow of fluid between said ports to said second and third positions, respectively, communicating said inlet port to said outlet port and said outlet port to said exhaust port, and further comprising means respectively operatively connecting one of said members to said base support means and the other of said members to said seat support means for relative movement therebetween among said positions in response to changes in height of said seat support means relative to said base support means.

14. The seat assembly according to claim 10 in which said fluid pressure operated motor means includes a cylinder member having a partition defining an aperture therein, a piston member reciprocably disposed within said cylinder member and including a piston rod extending through said aperture with radial clearance relative to the latter, and a pair of spaced tapered means on said piston rod on opposite sides of said partition for cooperation with said aperture to vary the rate of flow of fluid within said cylinder from one side of said partition to the other in said extreme positions of said seat support means.

15. The seat assembly according to claim 10 in which said fluid pressure operated motor means is operatively connected to said seat support means to one side of a vertical plane through the fore and aft center line thereof, and further comprising a pair of guide link means each having one end thereof respectively pivotally connected to said seat support means on opposite sides of said plane, and torsion bar means rotatably supported on said base support means, the other ends of said guide link means being respectively rigidly secured to said torsion bar means, whereby the thrust of said motor means on said one side of said plane is transmitted through said guide link means and said torsion bar means to the other side of said plane.

16. The seat assembly according to claim 10 further comprising means restricting flow of fluid between said motor means and said control valve means in said second and third positions of the latter.

17. The seat assembly according to claim 10 in which said base support means comprises fixed support means, movable support means, said yieldable suspension means interconnecting said seat support means and said movable support means, and further comprising selectively adjustable means interconnecting said fixed and movable support means to adjust the latter to and hold it at a predetermined height relative to said fixed support means.

18. The seat assembly according to claim 17 in which said selectively adjustable means comprises a fluid pressure operated motor means including relatively reciprocable piston and cylinder members, and means communicating said source to said last-named motor means and including manually operable control valve means controlling the supply and exhaust of operating fluid under pressure to and from said motor means to selectively adjust and hold the height of said movable support means.

19. A seat assembly comprising base support means, seat support means, suspension means including motor means having relatively reciprocable thrust producing members respectively operatively connected between said base support means and said seat support means to one side of a vertical plane through the fore and aft center line of the latter, guide link means each having one end thereof respectively pivotally connected to said seat support means on opposite sides of said plane, and torsion bar means rotatably supported on said base support means, the other ends of said guide link means being respectively rigidly secured to said torsion bar means, whereby the thrust of said motor means on said one side of said plane is transmitted through said guide link means and said torsion bar means to the other side of said plane.

20. A seat assembly comprising base support means, seat support means, fluid pressure operated motor means operatively connected between said seat and base support means, a source of substantially incompressible fluid under pressure, circuit means communicating said source to said motor means and including selector valve means selectively controlling the supply and exhaust of fluid to and from said motor means to selectively adjust the position of said seat support means relative to said base support means, and yieldable means responsible to variations in the pressure of the fluid in said motor means in response to variations in the load imposed on said seat support means to cushion movement of the latter relative to said base support means, the cushioning characteristics of said yieldable means being substantially unchanged by the supply and exhaust of said fluid through said circuit means.

21. The seat assembly according to claim 20 further comprising parallelogram-type guide linkage means operatively pivotally connected between said base support means and said seat support means and being operable to maintain the latter substantially horizontal during cushioned movement thereof relative to said base support means.

22. The seat assembly according to claim 20 further comprising a pair of laterally spaced guide link means each having one end thereof respectively pivotally connected to said seat support means, and torsion bar means rotatably supported on said base support means, the other ends of said guide link means being respectively rigidly secured to said torsion bar means.

23. The seat assembly according to claim 20 further comprising a first pair of laterally spaced guide link means each having one end thereof respectively pivotally connected to said seat support means, torsion bar means rotatably supported on said base support means, the other ends of said guide link means being respectively rigidly secured to said torsion bar means, and a second pair of laterally spaced guide link means each having the opposite ends thereof respectively pivotally connected to said seat support means and base support means in spaced relation to the respective connections of the ends of said first pair of guide link means thereto to form a parallelogram-type linkage to maintain said seat support means substantially horizontal during cushioned movement thereof relative to said base support means.

24. The seat assembly according to claim 23 wherein said seat support means includes laterally spaced depending wall members substantially enclosing a major portion of the lengths of said first and second pairs of guide link means, the respective pivotal connections of said first and second pairs of guide link means to said seat support means being to said respective wall members.

25. A seat assembly comprising base support means, seat support means, fluid pressure operated motor means operatively connected between said seat and base support means, a source of substantially incompressible fluid under pressure, circuit means communicating said source to said motor means and including selector valve means selectively controlling the supply and exhaust of fluid to and from said motor means to selectively adjust the position of said seat support means relative to said base support means, and yieldable accumulator means including compressible fluid means communicating with said circuit means and being responsive to changes in the pressure of the fluid in the latter in response to variations in the load imposed on said seat support means to cushion movement of the latter relative to said base support means, the cushioning characteristics of said accumulator means being substantially unchanged by the supply and exhaust of said fluid through said circuit means.

26. A seat assembly comprising base support means, seat support means, fluid pressure operated motor means operatively pivotally connected between said base and seat support means and including relatively reciprocable piston and cylinder members, a source of substantially incompressible fluid under pressure, circuit means communicating said source to said motor means and including manually operable selector valve means having a neutral position holding fluid in said circuit means between said valve means and said motor means, said valve means having first and second operating positions respectively controlling supply and exhaust of fluid to and from said motor means to selectively adjust the position of said seat support means relative to said base support means, and yieldable accumulator means including a compressible fluid communicating with said circuit means, said accumulator means with said valve means in said neutral position thereof being responsive to changes in the pressure of the fluid in said circuit means as said members of said motor means reciprocate relative to each other in response to variations in the load imposed on said seat support means to yieldably cushion movement of the latter relative to said base support means, the cushioning characteristics of said accumulator means being substantially unchanged by the supply and exhaust of said fluid through said circuit means.

References Cited by the Examiner
UNITED STATES PATENTS

| | | | |
|---|---|---|---|
| 2,629,426 | 2/1953 | Hawkins | 248—399 |
| 2,879,829 | 3/1959 | Lavoie et al. | 254—93 X |
| 2,880,782 | 4/1959 | Conner | 248—399 |
| 2,983,307 | 5/1961 | Meyer | 248—419 |
| 3,036,844 | 5/1962 | Vogel | 280—124 |
| 3,075,736 | 1/1963 | Freedman | 248—400 |
| 3,086,742 | 4/1963 | Severson | 248—399 |
| 3,096,066 | 7/1963 | Granet et al. | 248—399 |

CLAUDE A. LE ROY, *Primary Examiner.*